United States Patent [19]

Mitsutake

[11] Patent Number: 4,697,627

[45] Date of Patent: Oct. 6, 1987

[54] PNEUMATIC TIRE TREAD

[75] Inventor: Katsuharu Mitsutake, Itami, Japan

[73] Assignee: Toyo Tire & Rubber Company Limited, Osaka, Japan

[21] Appl. No.: 821,788

[22] Filed: Jan. 23, 1986

[30] Foreign Application Priority Data

Feb. 7, 1985 [JP] Japan .................................. 60-22665

[51] Int. Cl.⁴ ............................................. B60C 11/06
[52] U.S. Cl. ............................................... 152/209 R
[58] Field of Search ......... 152/209 R, 209 D, DIG. 1

[56] References Cited

U.S. PATENT DOCUMENTS 2,260,193 10/1941 Overman .......................... 152/209 R
2,265,543 12/1941 Overman .......................... 152/209 R
3,951,193 4/1976 Yeager ............................. 152/209 R
4,423,760 1/1984 Treves et al. ..................... 152/209 R Primary Examiner—Michael W. Ball
Attorney, Agent, or Firm—Murray and Whisenhunt

[57] ABSTRACT

A pneumatic tire for motor vehicles having a plurality of zigzag grooves formed in its tread circumferentially thereof, the tire being characterized in that the bottom of each of the grooves is stepped to provide a deep groove bottom along one of the walls defining the groove and a shallow flat groove bottom along the other wall.

3 Claims, 7 Drawing Figures

PNEUMATIC TIRE TREAD

The present invention relates to a pneumatic tire for motor vehicles, and more particularly to an automotive pneumatic tire having circumferential zigzag grooves in its tread.

Figure 6:
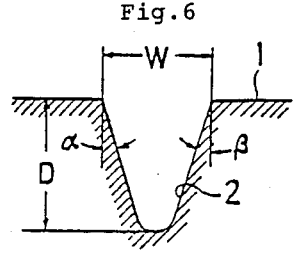

Automotive pneumatic tires are known which have a plurality of zigzag grooves formed in the tread circumferentially thereof. As shown in FIG. 6, the conventional groove is substantially V-shaped in cross section and has a depth D which is larger than its width W on the tread 1.

Figure 7:
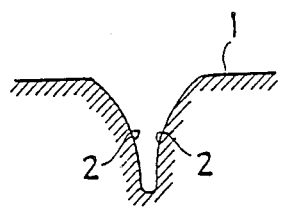

Since the depth D of the conventional groove is larger than its width W as mentioned above, the walls 2 defining the groove greatly deform under a load. During the rotation of the tire, the walls 2 bulge at the ground bearing portion to narrow the groove as shown in FIG. 7. Accordingly, if a stone of a size approximate to the width W is trapped in the groove during driving, the stone revolves with the tire as held between the opposed walls 2 in biting engagement therewith, such that even after the stone engaging portion moves out of contact with the ground, the stone remains lodged in the groove. When the stone engaging portion engages another stone upon contacting the ground subsequently, the first stone is further forced into the groove by the second stone to eventually cause damage to the bottom of the groove.

Recent radial tires have in the tread portion a belt reinforcement layer of tough steel cords. The reinforcement layer gives the tread and the groove bottom portion enhanced rigidity, which in turn restrains the movement of these portions, so that stones are liable to engage in the groove during driving and will not be released readily when held in the groove. As the bottom of the groove becomes damaged progressively, the reinforcement layer breaks, consequently making the tire no longer usable to shorten the life of the tire. Incidentally, if the groove width W is increased with the groove depth D fixed, the ratio of the width W to the tread width increases, reducing the wear resistance of the tread to result in uneven wear, whereas when the depth D is decreased with the width W fixed, the wear on the tread eliminates the groove early.

An object of the present invention is to provide an automotive pneumatic tire formed with grooves which have a reduced likelihood of engaging stones and from which stones engaged in can be forced out easily.

Another object of the present invention is to provide an automotive pneumatic tire in which the tread has high wear resistance and which has a prolonged life.

The present invention provides a pneumatic tire for motor vehicles having a plurality of zigzag grooves 12 formed in its tread 11 circumferentially thereof, the tire being characterized in that the bottom of each of the grooves 12 is stepped to form a deep groove bottom 14 along one of the walls defining the groove and a shallow flat groove bottom 13 along the other wall.

The present invention and a coventional tire are shown with reference to drawings.

Figure 1:
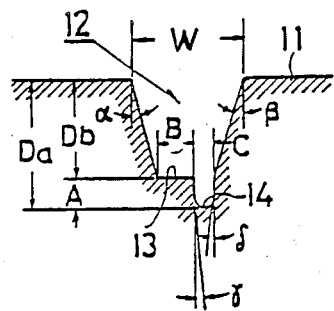
Figure 2:
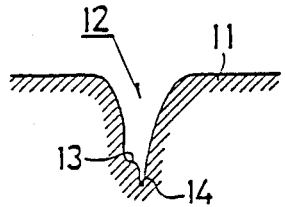
Figure 3:
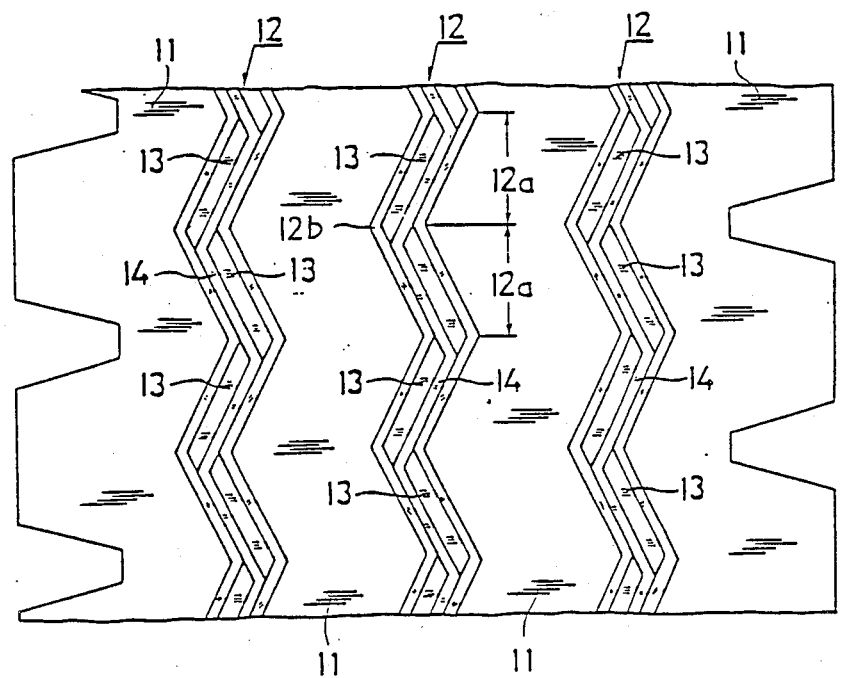
Figure 4:
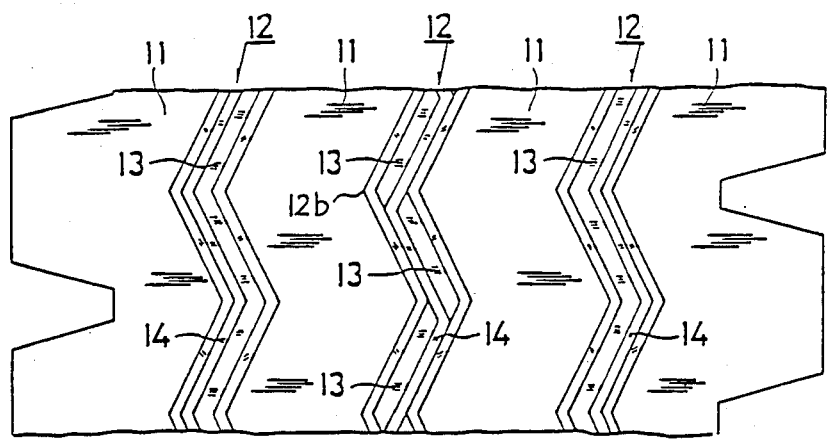
Figure 5:
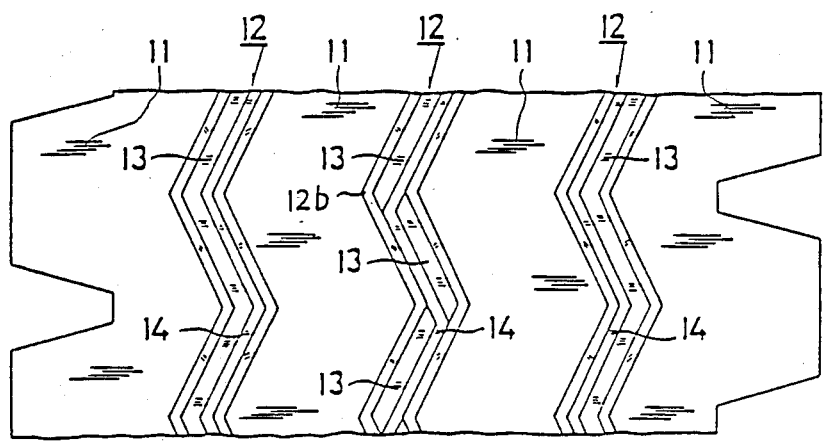

FIG. 1 is a sectional view showing the tread portion of Embodiment 1 of the present invention, FIG. 2 is a sectional view showing the tread portion when it is loaded, FIG. 3 is a surface view showing the tread of Embodiment 1, FIG. 4 is a surface view showing the tread of Embodiment 2, FIG. 5 is a surface view showing the tread of Embodiment 3, FIG. 6 is a sectional view showing the tread portion of a conventional tire, and FIG. 7 is a sectional view showing the same when it is loaded.

In the drawings, 11 ... tread, 12 ... groove, 13 ... shallow groove bottom, 14 ... deep groove bottom, W ... width of groove, Da ... overall depth of groove, Db ... depth of shallow groove bottom, A ... height of shallow groove bottom, B ... width of shallow groove bottom, C ... groove width at the position of shallow groove bottom.

The groove 12 of the invention will be compared with a conventional groove, with the overall depth Da of the deep groove bottom 14 made equal to the depth D of the conventional groove. The provision of the shallow groove bottom 13 imparts increased rigidity to the groove defining walls and reduces the amount of deformation of the walls when the tread comes into contact with the ground, consequently reducing the likelihood of stones engaging in the groove, while the shallow groove bottom 13 prevents stones from advancing toward the deep groove bottom 14. Even if a stone engages in the groove 12, the stone is forced out by the elasticity of the shallow groove bottom 13 upon the walls restoring themselves when the stone engaging portion leaves the ground with the rotation of the tire.

The stone can be effectively forced out when the depth Db of the shallow groove bottom 13 is smaller than the width W of the groove 12. If the depth Db of the shallow groove bottom 13 is greater than the groove width W, the shallow flat groove bottom 13 fails to produce the contemplated effect. The groove width W is usually set to 6 to 10% of the tread width TW, while the overall depth Da of the groove 12 is set according to the same standard as adopted for the conventional groove depth D. The height A of the shallow groove bottom 13 relative to the deep groove bottom 14, i.e., the difference Da–Db between the overall depth Da of the groove 12 and the depth Db of the shallow groove bottom 13 is set preferably to 20 to 50% of the overall depth Da. In other words, the depth Db of the shallow groove bottom 13 is preferably 50 to 80%, more preferably 70 to 80%, of the overall depth Da. If the depth Db is less than 50%, the groove wall having the shallow groove bottom 13 will exhibit excessive rigidity to permit uneven wear, whereas if it is above 80%, stones will not be forced out from the groove 12 effectively. The width B of the shallow groove bottom 13 is preferably 20 to 80%, more preferably 25 to 40%, of the groove width W and is further 100 to 200% of the width C of the deep groove portion at the depth of the shallow groove bottom 13. If the width B of the shallow groove bottom 13 is too small, stones will not be forced out effectively, whereas too large a width B renders the groove 12 similar to a conventional groove of reduced depth and is likely to make the shallow groove bottom 13 no longer serviceable as a step and to permit a crack to develop in the deep groove bottom 14. Preferably, the angles $\alpha$ and $\beta$ of inclination of the groove walls at the tread is 0 to 18 degrees, and the angles $\gamma$ and $\delta$ of inclination of the groove walls at the position of the shallow groove bottom 13 are 0 to 5 degrees.

FIG. 3 shows an automotive tire of the size 10.00R20 having three zigzag grooves 12 formed in its tread 11.

Each of the grooves 12 has the cross section shown in FIG. 1 and is 13.0 mm in groove width W, 16.0 mm (123% of W) in overall depth Da, 12.5 mm (78% of Da) in the depth Db of the shallow groove bottom 13, 3.5 mm (22% of Da) in the height A of the bottom 13, 4.0 mm (31% of W) in the width B of the shallow groove bottom 13, 2.5 mm in the width of the deep groove portion at the position of the shallow groove bottom 13 (B/C=1.6). As seen in FIG. 3, the shallow groove bottom 13 is formed alternately at opposite sides of the groove 12 from one straight portion 12a of the zigzag groove 12 to another straight portion 12a thereof. At each straight portion 12a, the edge of the shallow groove bottom 13 is in parallel with the edge of the groove 12. The tire of the first embodiment (Embodiment 1) and a conventional tire having no shallow groove bottom 13 (with reference to FIG. 6, groove width W=13.0 mm, groove depth D=16.0 mm, angles of inclination of groove walls 2, α, β=18 degrees) were checked for the force required for removing stones about 10 mm in diameter and forced into the groove in the left shoulder, the center groove and the groove in the right shoulder. The results are given in the following table, in which the measurement of the comparative example (conventional tire) is expressed as 100.

TABLE

|  | Embodiment 1 | Comparative Example |
| --- | --- | --- |
| Left shoulder | 60 | 100 |
| Center | 45 | 100 |
| Right shoulder | 55 | 100 |

The table shows that the force required for removing the stones from the tire of the invention is about one half of the force required for the conventional tire. Accordingly the stones engaged in the grooves during running can be easily forced out without causing damage to the groove bottom. With Embodiment 1, the shallow groove bottom 13 is forced alternately at opposite sides of the zigzag 12 from straight portion 12a to straight portion 12a. This arrangement diminishes uneven wear. At the bent portion 12b of the groove 12 in which stones are liable to engage, the shallow groove bottom 13 is present at each of opposite sides of the groove. The effect to force out the stone is therefore enhanced twofold. According to Embodiment 1, the edge of the shallow groove bottom 13 is parallel with the edge of the groove 12, so that a stone engaging in the straight portion 12a at any part thereof can be forced out with the same effectiveness.

FIG. 4 shows Embodiment 2 having a center groove 12 the same as the corresponding one of Embodiment 1 and a groove 12 in each of opposite shoulders in which a shallow groove bottom 13 is formed toward the center. FIG. 5 shows Embodiment 3 having a center groove 12 which is the same as those of Embodiments 1 and 2 and a groove 12 in each of opposite shoulders in which a shallow groove bottom 13 is provided toward the corresponding shoulder. Like Embodiment 1, Embodiments 2 and 3 are so adapted that damage to the groove bottom is diminished. However, since the shallow groove bottom 13 in the shoulder groove is positioned toward one side thereof, the opposed groove edges differ greatly in rigidity owing to the presence or absence of the shallow groove bottom 13 to result in uneven ground contacting pressure, so that Embodiments 2 and 3 are more prone to uneven wear than Embodiment 1. Further since the shallow groove bottom 13 is provided at only one side at the bent portion 12b, the effect to force out stones from this portion is lower than in Embodiment 1.

Even if stones engage in the grooves during running, the stones can be forced out easily, so that the groove bottom is less susceptible to damage. With tires having a belt reinforcement layer, the tire can be renewed to extend the life of the tire.

I claim:

1. A pneumatic tire for motor vehicles comprising:
a circumferentially extending tread having a tread surface for contacting a road surface; and
a plurality of zigzag grooves formed in said tread through said tread surface, wherein each of said zigzag grooves is defined by a first zigzag wall, a bottom and a second zigzag wall, said first zigzag wall and said second zigzag wall being parallel to one another and spaced apart by a predetermined distance, said bottom of each of said grooves being stepped to provide a deep groove bottom substantially parallel to said tread surface and spaced therefrom by a first predetermined depth adjacent one of said first and second walls and a shallow flat groove bottom substantially parallel to said tread surface and spaced therefom by a second predetermined depth adjacent the other of said first and second walls, said first predetermined depth being greater than said second predetermined depth, said shallow flat groove bottom having a substantially constant width measured transverse to said adjacent wall, said deep groove bottom being of a substantially zigzag shape, said zigzag shape being parallel to said adjacent one of said first and second walls, said deep groove bottom and said shallow groove bottom being formed alternately, at opposite sides of the groove, along a straight portion of said first zigzag wall and a straight portion of said second zigzag wall.

2. The pneumatic tire for motor vehicles as defined in claim 1, wherein said second predetermined depth is 20 to 50% of said first predetermined depth.

3. The pneumatic tire for motor vehicles as defined in claim 1, wherein said width of said shallow flat groove bottom is 20 to 80% of said predetermined distance.

* * * * *